United States Patent [19]
Trostler

[11] Patent Number: 5,291,206
[45] Date of Patent: Mar. 1, 1994

[54] MULTIPLE TARGET DISCRIMINATION SYSTEM

[75] Inventor: Richard M. Trostler, Claremont, Calif.

[73] Assignee: Hughes Missile Systems Company, Los Angeles, Calif.

[21] Appl. No.: 669,356

[22] Filed: Sep. 14, 1967

[51] Int. Cl.⁵ ............................................. G01S 13/60
[52] U.S. Cl. ..................................... 342/62; 342/103; 342/104
[58] Field of Search ................ 343/7 RS, 8; 342/62, 342/103, 104

[56] References Cited

U.S. PATENT DOCUMENTS

| | | | |
|---|---|---|---|
| 3,849,779 | 11/1974 | Boyd | 342/103 X |
| 4,010,467 | 3/1977 | Slivka | 342/62 X |
| 4,136,343 | 1/1979 | Heffner et al. | 342/62 X |

*Primary Examiner*—T. H. Tubbesing

[57] ABSTRACT

A radar homing system in a guided missile for intercepting one of a group of targets, such as aircraft flying in formation. Offset circuitry places undesired Doppler target returns outside of the IF filter bandpass frequency of the system. The system is designed to take cognizance of the highest Doppler frequency derived from the targets.

6 Claims, 1 Drawing Sheet

MULTIPLE TARGET DISCRIMINATION SYSTEM

BACKGROUND OF THE INVENTION

This invention provides a means by which a guided missile, a homing type missile, e.g., when confronted by two or more targets in formation, can discriminate against all but one of the targets, and can successfully intercept the selected target.

The science of homing guidance systems in missiles has been extensively and successfully practiced for many years in the interceptions and destruction of targets of many shapes, speeds and closing velocities. However, if instead of one target, the threat is a multiplicity of targets, such as air vehicles flying in formation, the probability of successfully intercepting one of the targets is greatly diminished. The usual reaction of a homing system to a multiple target threat is to attack the center of the reflected energy emitted from the multiple target formation. As a result, the missile may fly through the formation and miss all of the targets.

An active or semi-active homing system in a missile derives a target signal by illuminating the target with a narrow beam of radio energy and then comparing the frequency of this radio beam as received by the missile with the frequency of the portion reflected from the target. The difference between the direct beam frequency and the reflected beam frequency is a function of the closing velocity between the missile and the target. This is known as the Doppler effect. If the closing velocity between the missile and the target is zero, the difference or Doppler frequency will also be zero and the missile will never get any closer to the target. In the usual case, there will be an appreciable closing velocity between the missile and the target and a usuable Doppler frequency will result which will be proportional to the closing velocity.

In this case of multiple targets, two factors serve to produce differences between the Doppler frequencies derived for each of the targets. The first is the effect called jockeying which is caused by speed differences among the targets as they attempt to maintain their formation positions. This can produce Doppler difference frequencies of up to several hundred hertz per second. The second cause of Doppler differences among the target returns is produced by the geometrical relationships that occur in that portion of the flight just prior to intercept. This can be illustrated by assuming, for example, that a missile is heading straight for one of the targets in a formation. As the distance between the missile and the target formation decreases, the angular spread among the targets becomes increasingly significant. While the closing velocity between the missile and the target toward which the missile is steering will not change, the closing velocity between the missile and each of the other targets will decrease at an increasing rate and will drop to zero at the interception of the chosen target. Therefore, it can be seen that in order to attain a successful interception of one of a group of targets, a multiple target system must be able to select and derive its guidance from the target having the highest Doppler frequency while suppressing the guidance information of the other targets. The present invention provides a solution to the problem by utilizing the frequency characteristics of the multiple target signals to discriminate against all but one of the targets.

SUMMARY OF THE INVENTION

The present invention is a radar homing system for use in guided missiles and the like for the successful interception of one of a group of targets flying in a formation. The initial target acquisition phase is based on the variation in Doppler returns from the multiple targets due to jockeying, i.e., speed variations necessarily involved in maintaining flight formation. Subsequently, the system takes cognizance of the highest Doppler frequency returned from the targets which due to the geometry of the attack, results in the constant tracking of the target for which the missile is headed. Such acquisition and tracking is implemented by an electronic component arrangement comprising an input mixer to which is applied the incoming Doppler signals and the output signal of a voltage controlled oscillator. The output signal of the input mixer is applied to two intermediate frequency (IF) channels, one of which is designated as the single-sideband IF channel and the other as the carrier IF channel. A single-sideband system is used for reasons of economy only. Those skilled in the art will understand that a double-sideband system using two sideband amplifiers, one above and one below the carrier frequency, would result in a superior performance. Narrow band filters in each of the IF channels transmit signals of the desired frequencies to an IF amplifier in each channel while substantially attenuating all other frequencies. Offset circuitry in the carrier IF channel provides a signal to an integrating circuit which in turn controls the operating frequency of the voltage controlled oscillator. In order to achieve multiple target discrimination, the normal operation of the signals in the center of the carrier channel filter is modified by the offset circuitry system to produce an offset of the signals to the edge of the response characteristic of the filter. The direction of offset relative to the filter center frequency is such as to position the lower Doppler frequency targets farther down the filter attenuation characteristic, as compared to the placement of the higher frequency target.

Therefore, it is an object of this invention to provide a radar homing missile system which can discriminate against all but one of two or more targets in a formation.

Another object of this invention is to provide a radar homing missile system which utilizes the Doppler frequency characteristics derived from a multiplicity of targets in a formation to discriminate against all but one of the targets.

It is a further object of this invention to provide a radar homing missile system which utilizes the highest Doppler frequency derived from two or more targets in a formation to discriminate against all but one of the targets and to successfully intercept the one selected target.

Another object of this invention is to provide a radar homing missile system in which an electronic circuit arrangement incorporating offset circuitry discriminates against the lowest Doppler frequency characteristics derived from two or more targets in a formation and selects and derives guidance from the target with the highest Doppler frequency to successfully intercept the selected target.

Other objects and features of the invention, as well as the many advantages thereof, will be readily apparent to those skilled in the art from a consideration of the following written description and accompanying drawings.

DESCRIPTION OF THE PREFERRED EMBODIMENT

Figure 1:
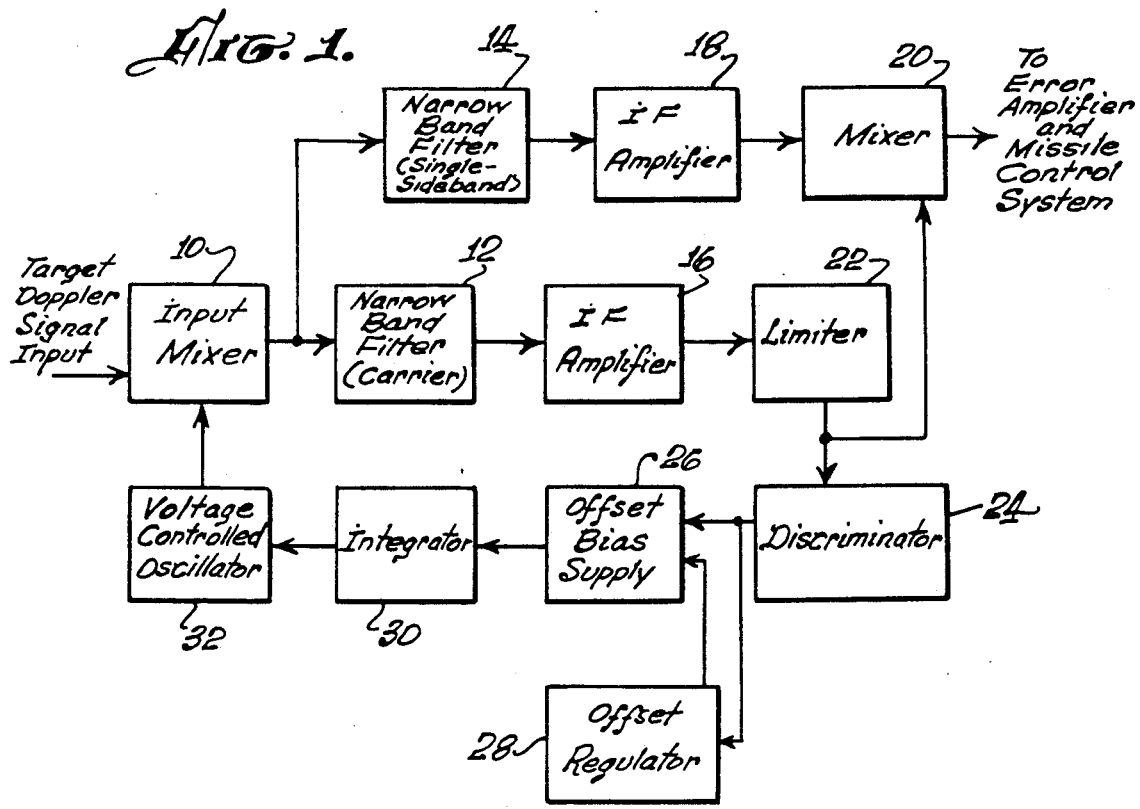
FIG. 1 is a block diagram of the electronic circuit arrangement embodying the invention.
Figure 2:
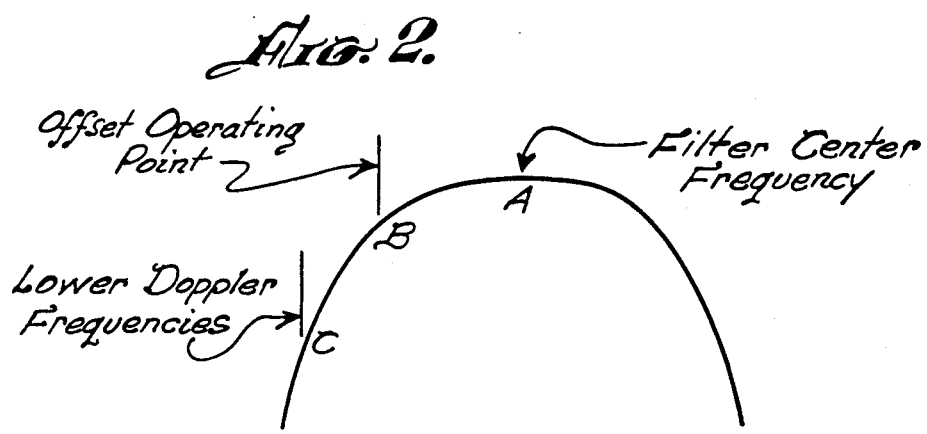
FIG. 2 illustrates the frequency characteristics of the filters shown in FIG. 1.

Referring to FIG. 1, the incoming target Doppler signals are fed to an input mixer 10 which may be a four-diode balanced circuit, for example. The output of input mixer 10 is coupled to a narrow band filter 12 responsive to the carrier intermediate frequency (IF) of the system and to a matching narrow band filter 14 responsive to one of the single-sidebands of the system. Because of their high selectivity, crystal filters are being utilized in the present invention, although, as is known in the art, other filter arrangements may be utilized. The frequency characteristic or response curve for filters 12, 14 is shown in FIG. 2, with the center frequency point indicated at A, and the offset operating point and the lower Doppler frequency operating point indicated to be generally at B and C, respectively. The outputs of filters 12, 14 in FIG. 1 are connected to IF amplifiers 16, 18, respectively, with the output of IF amplifier 18 being fed to a mixer 20 and thence to the error amplifier and the remainder of the missile control system circuitry (not shown). In the carrier IF channel, IF amplifier 16 is connected to a limiter 22 the output of which is coupled to mixer 20 in the single-sideband channel and also to a discriminator circuit 24. While not completely essential to the operation of the system, limiter 22, in addition to providing constant keying of the mixer 20, helps in eliminating some of the amplitude modulation present in the signals being processed and prevents loss of lock for fading targets. The outputs of the discriminator 24 is connected to an offset bias supply 26 and also to an offset regulator 28 the output of which is coupled to the offset bias supply 26. An integrator circuit 30 is connected to receive the output signal of the offset bias supply 26. The integrator 30 is coupled to a voltage controlled oscillator 32 the output of which is fed to input mixer 10. The operating frequency of the voltage controlled oscillator (VCO) 32 is controlled by the output of the integrator 30.

In operation, the Doppler signals derived from two or more targets are applied to the input mixer 10 which is keyed by the voltage controlled oscillator (VCO) 32. By the well-known heterodyne process, the output of the input mixer will contain the beat frequencies of each Doppler signal mixing with the VCO output. Selected beat frequencies will pass through narrow band filter 12, will be amplified by the IF amplifier 16 and applied to the limiter 22. The limiter output is applied to the discriminator 24. The polarity and amplitude of the d-c discriminator output is a function of the relationship of the IF amplifier 16 output frequency to the discriminator center frequency. The discriminator center frequency is the same as the center frequency of the narrow band filter 12.

If no offset bias is applied in series with the discriminator output, the discriminator output (produced by any difference between the IF amplifier 16 output frequency and the discriminator center frequency) will drive the integrator 30 which changes the frequency of the VCO 32. The direction of the frequency change will be such as to reduce the error between the IF amplifier 16 output frequency and the discriminator 24 center frequency. In this manner, the automatic frequency control (AFC) loop is closed and tracking of a changing Doppler frequency is accomplished. However, with this mode of operation (no offset bias applied), the system cannot resolve multiple targets if their difference frequencies are not greater than half of the narrow band filter 12 bandwidth. This resolving ability is inadequate with usable filter bandwidths, such as dictated by other considerations. In addition to this lack of resolving power, when the Doppler difference frequency is large enough to permit resolution, the probability of the system selecting the lowest Doppler target is the same as that of selecting the highest Doppler target. If the lowest Doppler target were selected, the Doppler returns would go through zero difference before target interception and resolution would be lost.

The foregoing problems are eliminated by the utilization of offset technique of this invention. Assume, for example, that a fixed value of offset bias voltage from offset bias supply 26 is applied in series with the discriminator 24 output to the integrator 30. (The purpose and function of the offset regulator 28 will be described hereinafter). The offset voltage will cause the integrator to produce a rate of change of output and, consequently, the VCO to produce a rate of change of frequency. As a result, the frequency applied to the discriminator will change and an output with a polarity opposite to that of the applied bias will be produced. When the frequency shifts far enough to produce a discriminator output equal in magnitude to that of the offset bias supply voltage, the two voltages will cancel and the net input to the integrator 30 will be zero and system equilibrium will be re-established. The magnitude of the offset bias supply voltage is selected to produce an offset frequency that is located approximately at the half-power point of the narrow band filter characteristic. The polarity of the offset bias voltage is selected to place the system operating point on the side of the narrow band filter which is in the direction from the center of the lower Doppler frequencies, as illustrated in FIG. 2. By this placement, any Doppler frequencies that are lower than the one being tracked by the system will be subjected to greater attenuation by the narrow band filter than the target being tracked by the system. This, in effect, produces suppression of the undesired target carrier frequency. In a similar manner, the sideband of the lower frequency target is suppressed by the filter characteristics of the sideband narrow band filter 14. The attenuation characteristics of filter 14, while offset by the amount of the scan frequency being used, are matched to the characteristics of carrier narrow band filter 12. Since the scan sideband of each target is a measure of the homing error of each target, the additional suppression of the scan sideband of the lower frequency targets by the offset arrangement described above allows the system to discriminate against the lower frequency targets in favor of the higher frequency target. The scan sidebands, with the sidebands of the lower closing velocity targets suppressed, are now converted from the intermediate frequency to the scan frequency by the heterodyne action of the mixer 20 which is keyed by the carrier channel output produced by the limiter 22. Further conversion of the scan output from mixer 20 to d-c steering control signals for the missile can be accomplished by demodulation using a scan reference signal in a conventional manner (not shown).

A problem exists in the system as described up to this point. If the closing velocity were decreasing, in order to maintain tracking, an input to the integrator 30 would be required with a magnitude proportional to the rate of decrease of the Doppler frequency. In order to produce such an input for the integrator, an additional frequency offset would be required to derive the necessary output from the discriminator. The additional frequency offset would move the operating point of the system further from the center of the narrow band filter. This condition could result in excessive attenuation of the desired Doppler frequency and possible loss of tracking. In the case of increasing closing velocities, the reverse would take place. Then, the offset operating point would be moved closer to the filter center frequency, and multiple target resolution capability would be decreased.

The foregoing problem is solved by use of the offset regulator 28 which senses the magnitude of the discriminator output. The desired amount of offset will produce a fixed value of output from the discriminator. If the discriminator output deviates from the desired value, the offset regulator causes the output of the offset bias supply to change in a compensating manner. As a result, the input to the integrator required by a changing closing velocity will be almost completely supplied by a change in the offset bias. Consequently, the offset operating point will experience negligible changes of position over the normal range of changing closing velocities. In the interest of simplicity, the system for the processing of the missile steering information presented as modulation on the target Doppler signals has not been described, since this is well-known and readily apparent to those skilled in the art.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What I claim is:

1. A multiple target discrimination system for processing target Doppler signals in a guided homing missile comprising:
   (a) a first heterodyning mixer having a pair of inputs, one of said inputs being adapted to receive target Doppler signals;
   (b) a voltage controlled oscillator coupled to the other of said inputs of said first heterodyning mixer;
   (c) first and second filters connected to an output of said first mixer, each of said filters having a response characteristic and selecting a mixer frequency product;
   (d) first and second IF amplifiers, said first IF amplifier being coupled to an output of said first filter, said second IF amplifier coupled to an output of said second filter;
   (e) a second heterodyning mixer having a pair of inputs, one of said inputs being connected to an output of said second IF amplifier;
   (f) a limiter coupled to an output of said first IF amplifier, said limiter having an output connected to the other of said inputs of said second heterodyning mixer;
   (g) a discriminator connected to said output of said limiter;
   (h) offset circuit means operably coupled to an output of said discriminator for producing an offset of signals received from the output of said discriminator to the respective edges of each of said response characteristics of said first and second filters; and
   (i) an integrator circuit connected to an output of said offset circuit means, said voltage controlled oscillation being coupled to an output of said integrator circuit.

2. The multiple target discrimination system defined in claim 1, wherein said offset circuit means includes:
   (a) an offset regulator connected to said output of said discriminator; and
   (b) an offset bias supply having a pair of inputs and an output, one of said inputs being coupled to said output of said discriminator, the other of said inputs being coupled to an output of said offset regulator, said output of said offset bias supply being connected to said integrator circuit.

3. The multiple target discrimination system defined in claim 1, wherein each of said first and second filters comprises a narrow band filter.

4. The multiple target discrimination system defined in claim 1, wherein said response characteristics of said first and second filters are matched.

5. The multiple target discrimination system defined in claim 1, wherein said first and second filters are crystal filter circuits.

6. The multiple target discrimination system defined in claim 1, wherein said first heterodyning mixer comprises a four-diode balanced circuit arrangement.

* * * * *